US012665659B2

(12) United States Patent
Ono et al.

(10) Patent No.: US 12,665,659 B2
(45) Date of Patent: Jun. 23, 2026

(54) WIRELESS RELAY SYSTEM, AND WIRELESS RELAY METHOD

(71) Applicant: NTT, Inc., Tokyo (JP)

(72) Inventors: Yu Ono, Musashino (JP); Tatsuya Nakatani, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 287 days.

(21) Appl. No.: 18/706,021

(22) PCT Filed: Nov. 1, 2021

(86) PCT No.: PCT/JP2021/040271
§ 371 (c)(1),
(2) Date: Apr. 30, 2024

(87) PCT Pub. No.: WO2023/073992
PCT Pub. Date: May 4, 2023

(65) Prior Publication Data
US 2025/0007601 A1     Jan. 2, 2025

(51) Int. Cl.
  *H04B 7/15*     (2006.01)
  *H04B 7/155*    (2006.01)
  *H04B 1/00*     (2006.01)

(52) U.S. Cl.
  CPC ....... *H04B 7/15528* (2013.01); *H04B 1/0003* (2013.01)

(58) Field of Classification Search
  CPC .... H04B 7/15528; H04B 1/0003; H04B 7/15; H04B 16/26; H04B 7/2631; H04B 7/15592; H04B 7/18532; H04B 7/18586
  See application file for complete search history.

(56) References Cited

U.S. PATENT DOCUMENTS

| | | | | |
|---|---|---|---|---|
| 10,419,077 | B1 * | 9/2019 | Wang .................... | H04W 84/18 |
| 2009/0074112 | A1 * | 3/2009 | Coersmeier ....... | H03M 13/6513 375/340 |
| 2010/0124257 | A1 * | 5/2010 | Yahya .................. | H04B 1/0053 375/219 |
| 2010/0273415 | A1 * | 10/2010 | Almgren ............ | H04B 7/15514 455/7 |

(Continued)

FOREIGN PATENT DOCUMENTS

JP        2018-042135 A      3/2018

*Primary Examiner* — Andrew Wendell
(74) *Attorney, Agent, or Firm* — XSENSUS LLP

(57) ABSTRACT

A wireless relay system includes a first software radio device that performs radio communication with a radio control device and a second software radio device that performs radio communication with a radio terminal. The first software radio device captures, as iq data, a radio signal received from the radio control device, transfers the captured iq data to the second software radio device in real time, converts the iq data transferred from the second software radio device into a radio signal, and transmits the radio signal to the radio control device. The second software radio device captures, as iq data, a radio signal received from the radio terminal, transfers the captured iq data to the first software radio device in real time, converts the iq data transferred from the first software radio device into a radio signal, and transmits the radio signal to the radio terminal.

2 Claims, 3 Drawing Sheets

(56)                         References Cited

U.S. PATENT DOCUMENTS

| | | | | |
|---|---|---|---|---|
| 2011/0188413 | A1* | 8/2011 | Kuo ..................... | H04W 16/26 370/279 |
| 2012/0115412 | A1* | 5/2012 | Gainey ................ | H04L 5/0007 455/7 |
| 2016/0081055 | A1* | 3/2016 | Chika .................. | H04W 16/26 370/315 |
| 2019/0326947 | A1* | 10/2019 | Kikuzuki .............. | H04B 1/707 |
| 2021/0328852 | A1* | 10/2021 | Shimanouchi ......... | H04L 27/36 |
| 2022/0321199 | A1* | 10/2022 | Abedini ............. | H04L 41/0813 |
| 2024/0235580 | A1* | 7/2024 | Sahin ...................... | H04B 1/30 |
| 2024/0396623 | A1* | 11/2024 | Ono ..................... | H04W 88/02 |
| 2024/0405847 | A1* | 12/2024 | Ono ..................... | H04W 16/26 |

* cited by examiner

Fig. 2

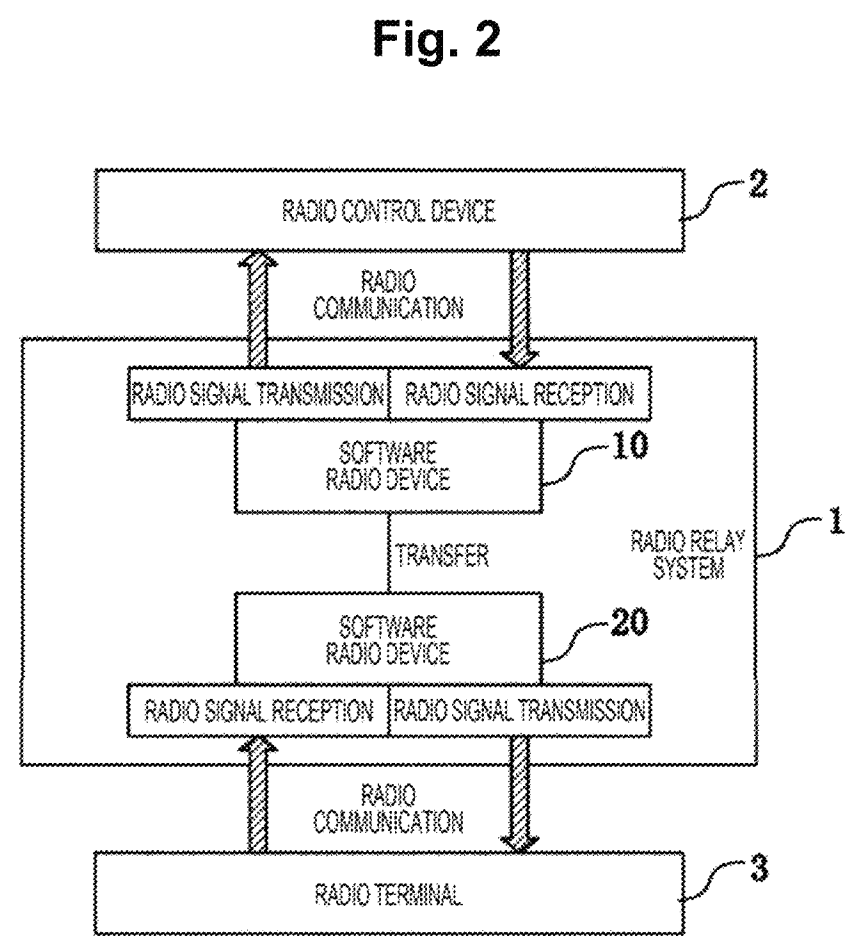

RADIO CONTROL DEVICE — 2

RADIO RELAY SYSTEM — 1

RADIO COMMUNICATION

RADIO SIGNAL RECEPTION

RADIO SIGNAL TRANSMISSION

SOFTWARE RADIO DEVICE — 10

TRANSFER

SOFTWARE RADIO DEVICE — 20

RADIO SIGNAL TRANSMISSION

RADIO SIGNAL RECEPTION

RADIO COMMUNICATION

RADIO TERMINAL — 3

Fig. 3

WIRELESS RELAY SYSTEM, AND WIRELESS RELAY METHOD

CROSS-REFERENCE TO RELATED APPLICATION

This application is a national stage application, pursuant to 35 U.S.C. § 371, of International Patent Application No. PCT/JP2021/040271, filed Nov. 1, 2021, the entire contents of which are incorporated herein by reference.

TECHNICAL FIELD

The present disclosure relates to a wireless relay system and a wireless relay method utilizing a software radio technology.

BACKGROUND ART

Patent Literature 1 proposes a method in which a relay apparatus including only an antenna and a transmission/reception function connects radio terminals which are under control of the relay apparatus, and batch signal processing is performed by an upper server.

CITATION LIST

Patent Literature

Patent Literature 1: JP 2018-42135 A

SUMMARY

Technical Problem

In the technology of Patent Literature 1, a device has a fixed connection configuration, and it is difficult to flexibly cope with a change or the like of the connection configuration depending on a situation.

The present disclosure has been made in view of the above-described problem. An object of the present disclosure is to realize a flexible measure for a situation in a wireless relay technology.

Solution to Problem

A wireless relay system according to an aspect of the present disclosure is a wireless relay system that relays radio communication between a radio control device and a radio terminal which is under control of the radio control device. The wireless relay system includes a first software radio function unit that performs radio communication with a radio control device and a second software radio function unit that performs radio communication with a radio terminal. The first software radio function unit captures, as iq data, a radio signal received from the radio control device, transfers the captured iq data to the second software radio function unit in real time, converts the iq data transferred from the second software radio function unit into a radio signal, and transmits the radio signal to the radio control device. The second software radio function unit captures, as iq data, a radio signal received from the radio terminal, transfers the captured iq data to the first software radio function unit in real time, converts the iq data transferred from the first software radio function unit into a radio signal, and transmits the radio signal to the radio terminal. The first software radio function unit includes a first transceiver that performs radio communication with the radio control device, a first autonomous control unit that controls radio communication between the first transceiver and the radio control device in a state where transfer of a signal between the first software radio function unit and the second software radio function unit is stopped, and a first monitor unit that activates the first autonomous control unit when a predetermined condition is satisfied. The second software radio function unit includes a second transceiver that performs radio communication with the radio terminal, a second autonomous control unit that controls radio communication between the second transceiver and the radio terminal in a state where transfer of a signal between the second software radio function unit and the first software radio function unit is stopped, and a second monitor unit that activates the second autonomous control unit when a predetermined condition is satisfied. The first autonomous control unit causes the first transceiver to exchange a vital monitoring signal with the radio control device. The second autonomous control unit causes the second transceiver to transmit a signal for causing the radio terminal to perform a predetermined operation.

A wireless relay method according to another aspect of the present disclosure is a wireless relay method performed by a wireless relay apparatus including a first software radio function unit that performs radio communication with a radio control device and a second software radio function unit that performs radio communication with a radio terminal which is under control of the radio control device. The wireless relay method includes: a first transfer step of capturing, as iq data, a radio signal received by the first software radio function unit from the radio control device and transferring the captured iq data to the second software radio function unit in real time; a second transfer step of capturing, as iq data, a radio signal received by the second software radio function unit from the radio terminal and transferring the captured iq data to the first software radio function unit in real time; a first transmission step of converting the iq data transferred in the first transfer step into a radio signal and transmitting the radio signal to the radio control device; a second transmission step of converting the iq data transferred in the second transfer step into a radio signal and transmitting the radio signal to the radio terminal; a first autonomous control step of controlling radio communication between the first software radio function unit and the radio control device in a state where the first transfer step and the second transfer step are stopped when a predetermined condition is satisfied; and a second autonomous control step of controlling radio communication between the second software radio function unit and the radio terminal in a state where the first transfer step and the second transfer step are stopped when a predetermined condition is satisfied. In the first autonomous control step, the first software radio function unit is caused to exchange a vital monitoring signal with the radio control device. In the second autonomous control step, the second software radio function unit is caused to transmit a signal for causing the radio terminal to perform a predetermined operation.

Advantageous Effects

According to the present disclosure, it is possible to realize flexibility in coping with a situation in a wireless relay technology.

BRIEF DESCRIPTION OF DRAWINGS

FIG. 2 is a diagram schematically illustrating a configuration and basic operation of the radio relay system (wireless relay system) according to Embodiment 1.

FIG. 3 is a block diagram illustrating a configuration example of a software radio device constituting the radio relay system (wireless relay system) according to Embodiment 1.

DESCRIPTION OF EMBODIMENTS

Figure 1:
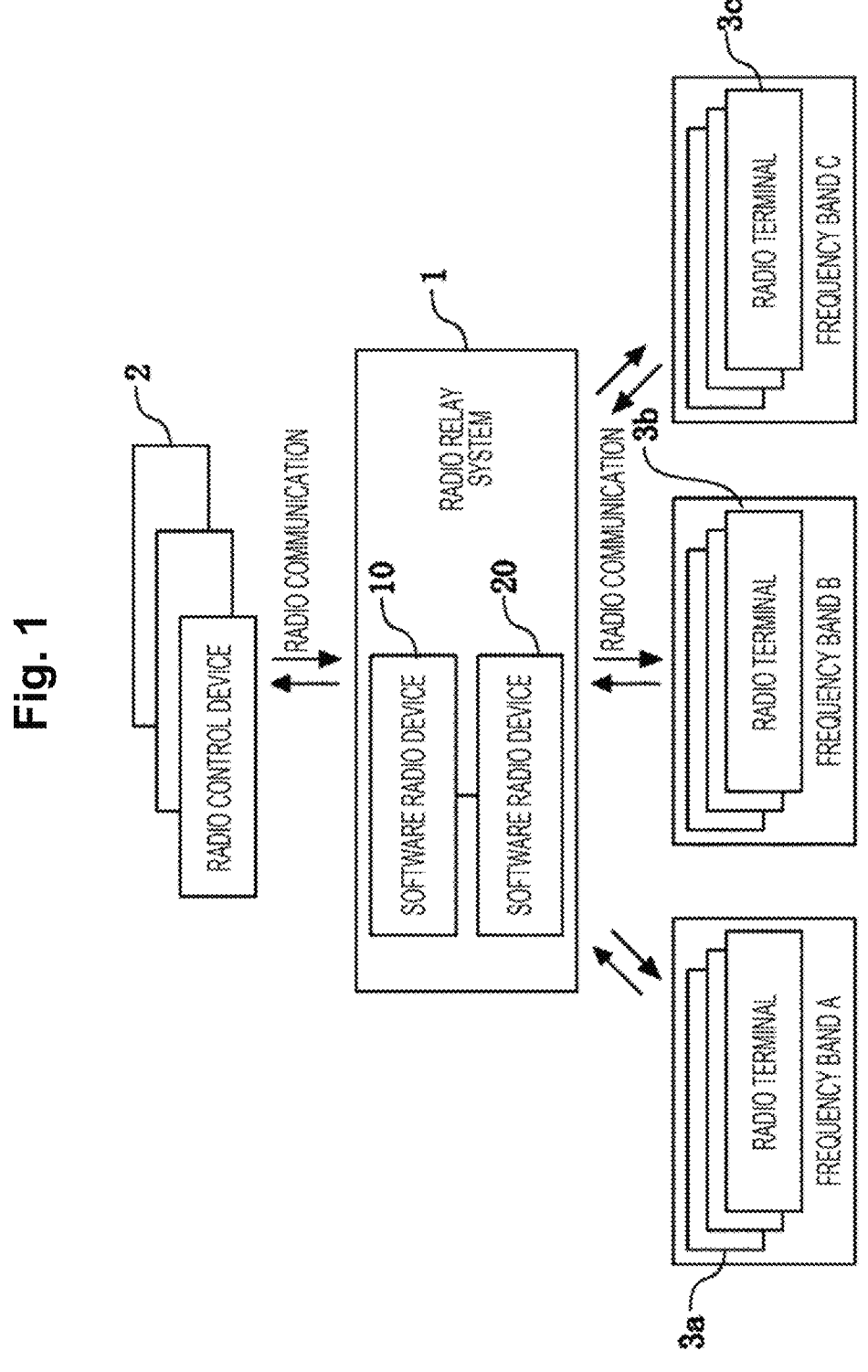
FIG. 1 is a diagram schematically illustrating a configuration and a basic operation of a radio relay system (wireless relay system) according to Embodiment 1.

Hereinafter, embodiments will be described with reference to the accompanying drawings. In this disclosure, redundant description will be simplified or omitted as appropriate. The present invention is not limited to the following embodiments. The present invention may include various modifications and combinations of configurations disclosed by the following embodiments without departing from the spirit of the present invention.

Embodiment 1

FIGS. 1 and 2 are diagrams schematically illustrating a configuration and a basic operation of a radio relay system 1 (wireless relay system) according to Embodiment 1. The radio relay system 1 is a system that relays radio communication between an upper radio control device 2 and a radio terminal 3 which is under control of the radio control device 2. The radio relay system 1 can be used in various types of radio communication in the mobile communication field, the IoT field, or the like. The radio relay system 1 can also be used, for example, in a local area network or the like in a large-scale commercial facility or the like.

As illustrated in FIG. 1, a plurality of radio control devices 2 may be provided. Similarly, a plurality of radio terminals 3 may also be provided. Each of the plurality of radio terminals 3 may belong to a different frequency band. For example, the plurality of radio terminals 3 include a radio terminal 3a belonging to a frequency band A, a radio terminal 3b belonging to a frequency band B, and a radio terminal 3c belonging to a frequency band C.

The radio relay system 1 according to this embodiment includes a first software radio device 10 and a second software radio device 20. Further, the radio relay system 1 according to this embodiment may include at least two software radio devices. The radio relay system 1 may include three or more software radio devices. The number of software radio devices constituting the radio relay system 1 can be appropriately set depending on a frequency band of radio communication to be relayed, a required transfer speed, and the like. The software radio devices are connected by a line that enables high-speed data communication to be performed. Each software radio device is connected by, for example, a UTP cable or an optical cable. Alternatively, each software radio device may be connected by a coaxial cable or the like.

The first software radio device 10 corresponds to a first software radio function unit according to this disclosure. The second software radio device 20 corresponds to a second software radio function unit according to this disclosure. The first software radio function unit and the second software radio function unit may be configured as one software radio device having the same housing. That is, the first software radio device 10 and the second software radio device 20 in this embodiment may be configured as one software radio device having the same housing. In this case, two input ports and two output ports may be provided in the same housing.

The first software radio device 10 performs radio communication with the radio control device 2. The second software radio device 20 performs radio communication with the radio terminal 3.

The first software radio device 10 captures, as iq data, a radio signal received from the radio control device 2. The first software radio device 10 transfers the captured iq data to the second software radio device 20 in real time over a high-speed line.

On the other hand, the second software radio device 20 captures, as iq data, a radio signal received from the radio terminal 3. The second software radio device 20 transfers the captured iq data to the first software radio device 10 in real time over a high-speed line.

The first software radio device 10 converts the iq data transferred from the second software radio device 20 into a radio signal and transmits, as a radio wave, the radio signal to the radio control device 2. The second software radio device 20 converts the iq data transferred from the first software radio device 10 into a radio signal and transmits, as a radio wave, the radio signal to the radio terminal 3.

As described above, the radio relay system 1 normally relays radio communication between the radio control device 2 and the radio terminal 3 which is under control of the radio control device 2. As used herein, the "normal time" means a time zone in which there are many communications such as daytime. In a normal state, a signal transmitted by the radio control device 2 is transmitted to the radio terminal 3 via the radio relay system 1. In a normal state, the radio terminal 3 is controlled by the radio control device 2.

Moreover, the radio relay system 1 has an autonomous operation function in addition to the above-described radio communication relay function. The autonomous operation function is a function of causing the radio relay system 1 to modulate and demodulate a signal and autonomously control the radio terminal 3, instead of the radio control device 2. An operation by the autonomous operation function is executed under a predetermined situation. The operation by the autonomous operation function is executed, for example, in a time zone in which there is little communication such as nighttime. In the time zone with little communication such as nighttime, for example, some of the plurality of radio terminals 3 come into a dormant state. Since the radio relay system 1 has the autonomous operation function, a connection configuration of a device can be flexibly changed, and effects such as processing distribution and efficiency can be obtained. In addition, for example, the radio control device 2 can be brought into a dormant state, and it is possible to reduce power consumption and secure maintenance time of the radio control device 2.

Figure 3:
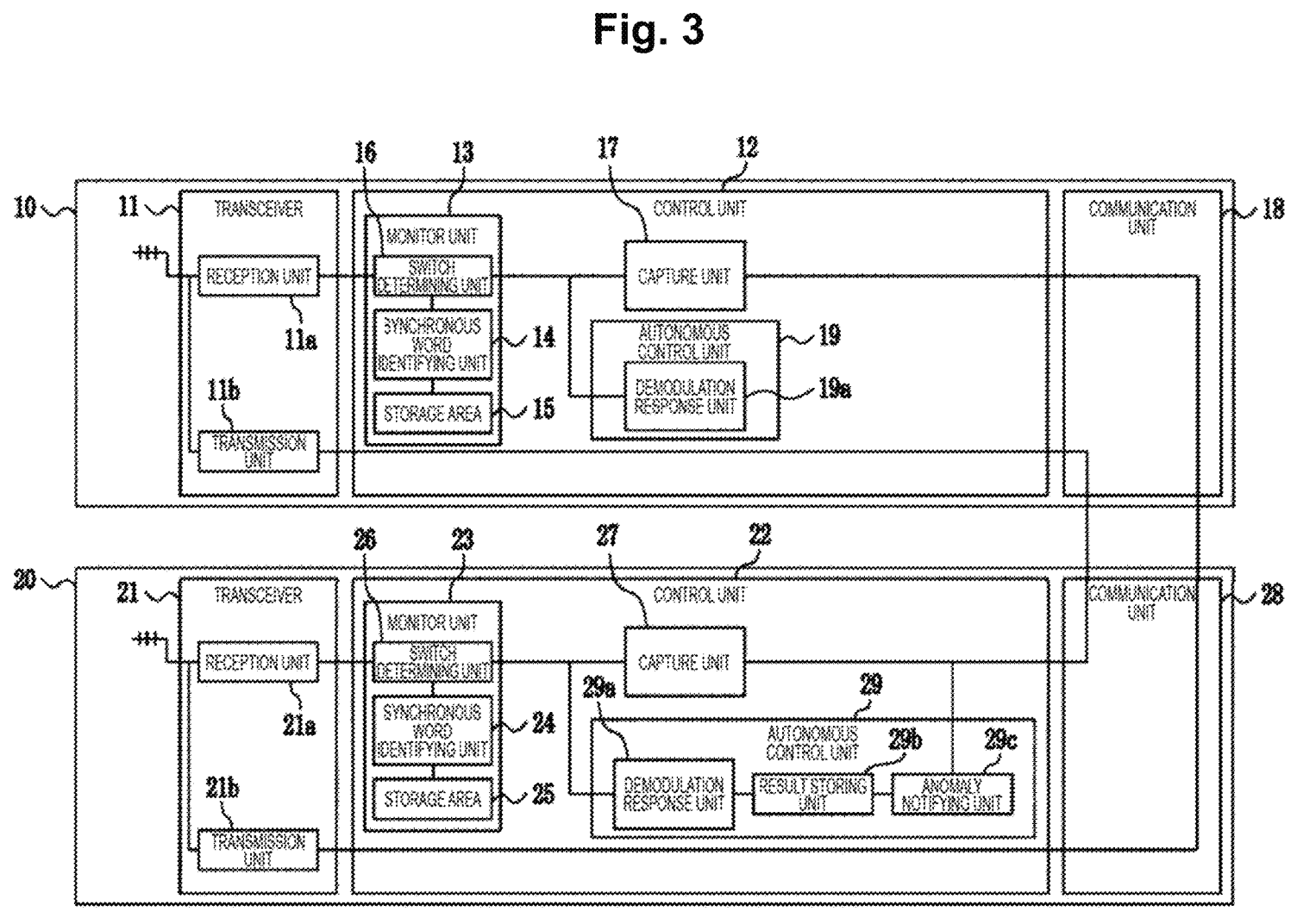

FIG. 3 is a block diagram illustrating a configuration example of a software radio device constituting the radio relay system (wireless relay system) according to Embodiment 1. As an example, the first software radio device 10 includes a transceiver 11 that performs radio communication with the radio control device 2, and a control unit 12 that implements various functions of the first software radio device 10. As an example, the second software radio device 20 includes a transceiver 21 that performs radio communication with the radio terminal 3, and a control unit 22 that implements various functions of the second software radio device 20.

The transceiver 11 is configured to include a reception unit 11a that receives a signal from the radio control device 2 and a transmission unit 11b that transmits a signal to the radio control device 2. The transceiver 21 is configured to include a reception unit 21a that receives a signal from the radio terminal 3 and a transmission unit 21*b* that transmits a signal to the radio terminal 3.

The control unit 12 includes a monitor unit 13 that implements a radio signal monitoring function. The monitor unit 13 is configured to include, for example, a synchronous word identifying unit 14 that identifies a synchronization word, a storage area 15, and the like. In addition, the control unit 12 includes a capture unit 17 that implements a radio signal capture function. The capture unit 17 captures, as iq data, the radio signal received by the transceiver 11 and transfers the captured iq data to the outside in real time. The capture unit 17, for example, transfers the iq data to the second software radio device 20 via a communication unit 18.

The control unit 22 includes a monitor unit 23 that implements a radio signal monitoring function. The monitor unit 23 is configured to include, for example, a synchronous word identifying unit 24 that identifies a synchronization word, a storage area 25, and the like. In addition, the control unit 22 includes a capture unit 27 that implements a radio signal capture function. The capture unit 27 captures, as iq data, a radio signal received by the transceiver 21 and transfers the captured iq data to the outside in real time. The capture unit 27, for example, transfers the iq data to the first software radio device 10 via a communication unit 28.

The radio relay system 1 receives and captures a radio signal within a designated frequency band. In this embodiment, it is possible to realize real-time capture and flexible change of the frequency band of a capture target by utilizing the characteristics of software defined radio.

The software radio device constituting the radio relay system 1 can identify a synchronization word in a frame constituting a radio signal transmitted from a radio device such as the radio control device 2 and the radio terminal 3. The frame includes a preamble, a synchronization word, a PHY header, a physical layer data payload, and an FCS. By identifying the synchronization word, the software radio device can efficiently capture only the frequency band used by the radio device that is a relay target.

According to the radio relay system 1 configured as described above, capture and transfer of the radio signal enable relay between various types of radio apparatuses to be realized. According to this embodiment, the type of the radio device capable of relaying is not limited by the frequency, the radio standards, or the installation locations. In addition, according to this embodiment, for example, the radio terminal 3 at a remote location can be accommodated in the radio control device 2.

In addition, in this embodiment, the control unit 12 includes an autonomous control unit 19 for realizing the autonomous operation function described above. The autonomous control unit 19 controls radio communication between the transceiver 11 and the radio control device 2 in a state where the transfer of the signal between the first software radio device 10 and the second software radio device 20 is stopped. The control unit 22 includes an autonomous control unit 29 for realizing the autonomous operation function described above. The autonomous control unit 29 controls radio communication between the transceiver 21 and the radio terminal 3 in a state where the transfer of a signal between the second software radio device 20 and the first software radio device 10 is stopped.

The monitor unit 13 activates the autonomous control unit 19 when a predetermined condition is satisfied. The monitor unit 23 activates the autonomous control unit 29 when a predetermined condition is satisfied. For example, the monitor unit 13 activates the autonomous control unit 19 when the current time is in a time zone registered in the storage area 15 in advance. Similarly, for example, the monitor unit 23 activates the autonomous control unit 29 in a case where the current time is in a time zone registered in the storage area 25 in advance.

Alternatively, for example, the autonomous control unit 19 and the autonomous control unit 29 may be activated when only the radio terminal 3 that generates a signal including a synchronization word registered in advance in the storage area 15 and the storage area 25 among the plurality of radio terminals 3 is in a situation of communicating with the radio relay system 1. The predetermined conditions for activating the autonomous control unit 19 and the autonomous control unit 29 can be optionally set. As an example, the monitor unit 13 includes a switch determining unit 16 that determines a condition for activating the autonomous control unit 19. As an example, the monitor unit 23 includes a switch determining unit 26 that determines a condition for activating the autonomous control unit 29.

When the autonomous control unit 19 and the autonomous control unit 29 are activated, the operation in the autonomous operation function of the radio relay system 1 described above is executed. Further, monitoring by the monitor unit 13 and the monitor unit 23 is continued even during the operation in the autonomous operation function. When the time is in the time zone registered in advance in the storage area 15 and the storage area 25, during the operation in the autonomous operation function, or when the radio relay system 1 detects a radio signal including a specific synchronization word registered in advance in the storage area 15 and the storage area 25, the return from the autonomous operation function to the relay function is performed.

When the autonomous control unit 19 and the autonomous control unit 29 are activated, the transfer of signals between the first software radio device 10 and the second software radio device 20 is stopped. Consequently, the communication between the radio control device 2 and the radio terminal 3 is disconnected.

As described above, the autonomous control unit 19 controls the radio communication between the transceiver 11 and the radio control device 2. The autonomous control unit 19 causes the transceiver 11 to exchange a vital monitoring signal with the radio control device 2. When the autonomous control unit 19 is activated, the first software radio device 10 demodulates a signal from the radio control device 2, transmits and receives only the vital monitoring signal as necessary, and guides the radio control device 2 to a standby state. As an example, the autonomous control unit 19 includes a demodulation response unit 19*a* for controlling demodulation of a signal from the radio control device 2 and exchange of the vital monitoring signal.

On the other hand, the autonomous control unit 29 controls the radio communication between the transceiver 21 and the radio terminal 3. When the autonomous control unit 29 is activated, the second software radio device 20 demodulates the signal from the radio terminal 3 and responds to the signal from the radio terminal 3 instead of the radio control device 2. When the autonomous control unit 29 is activated, communication by the radio terminal 3 is established even when the radio control device 2 is in a dormant state. As an example, the autonomous control unit 29 includes a demodulation response unit 29*a* for controlling exchange of signals between the second software radio device 20 and the radio terminal 3.

The autonomous control unit 29 causes the transceiver 21 to transmit a signal for causing the radio terminal 3 to execute a predetermined operation. The predetermined work corresponds to, for example, regular work or the like scheduled at night. Specifically, first, the connection is established by transmission and reception of the vital monitoring signal between the second software radio device 20 and the radio terminal 3. By using this connection establishment as a trigger, an instruction to perform regular work is transmitted to the radio terminal 3 by a radio signal according to a schedule and a sequence registered in advance.

As the content of the regular work, a test operation for confirming the normality of the radio terminal 3, automatic work in the nighttime period, and the like are assumed. When the regular work is completed, the radio terminal 3 transmits the result to the second software radio device 20. After the regular work is ended, the vital monitoring signal is exchanged between the second software radio device 20 and the radio terminal 3 again.

A result of the regular work is stored in, for example, a result storage unit 29*b*. When any anomaly occurs in the radio terminal 3 during the regular work, information indicating the occurrence of the anomaly is stored in the result storage unit 29*b*. When the function of the radio relay system 1 returns from the autonomous operation function to the relay function, the information on the occurrence of the anomaly stored in the result storage unit 29*b* is transmitted as a specific electric signal from the radio relay system 1 to the radio control device 2. A transmission operation of the information on the anomaly occurring in the radio terminal 3 during the regular work to the radio control device 2 is controlled by, for example, an anomaly notifying unit 29*c*.

According to the radio relay system 1 configured as described above, it is possible to realize flexibility in coping with a situation in a wireless relay technology. Further, each function of the radio relay system 1 (wireless relay system) can also be realized as a wireless relay method.

INDUSTRIAL APPLICABILITY

The wireless relay system, the wireless relay method, and the software radio devices according to the present disclosure can be applied to various types of radio communication.

REFERENCE SIGNS LIST

1 Radio relay system (Wireless relay system)
2 Radio control device
3 Radio terminal
3*a* Radio terminal
3*b* Radio terminal
3*c* Radio terminal
10 Software radio device
11 Transceiver
11*a* Reception unit
11*b* Transmission unit
12 Control unit
13 Monitor unit
14 Synchronous word identifying unit
15 Storage area
16 Switch determining unit
17 Capture unit
18 Communication unit
19 Autonomous control unit
19*a* Demodulation response unit
20 Software radio device
21 Transceiver
21*a* Reception unit
21*b* Transmission unit 22 Control unit
23 Monitor unit
24 Synchronous word identifying unit
25 Storage area
26 Switch determining unit
27 Capture unit
28 Communication unit
29 Autonomous control unit
29*a* Demodulation response unit
29*b* Result storing unit
29*c* Anomaly notifying unit

The invention claimed is:

1. A wireless relay system that relays radio communication between a radio control device and a radio terminal which is under control of the radio control device, the wireless relay system comprising:

a first software radio function unit that performs radio communication with the radio control device; and a second software radio function unit that performs radio communication with the radio terminal; and wherein the first software radio function unit captures, as In-phase and Quadrature "iq" data, a radio signal received from the radio control device, transfers the captured iq data to the second software radio function unit in real time, converts the iq data transferred from the second software radio function unit into a radio signal, and transmits the radio signal to the radio control device, wherein the second software radio function unit captures, as iq data, a radio signal received from the radio terminal, transfers the captured iq data to the first software radio function unit in real time, converts the iq data transferred from the first software radio function unit into a radio signal, and transmits the radio signal to the radio terminal, wherein the first software radio function unit includes a first transceiver that performs radio communication with the radio control device, a first autonomous control unit that controls radio communication between the first transceiver and the radio control device in a state where transfer of a signal between the first software radio function unit and the second software radio function unit is stopped, and a first monitor unit that activates the first autonomous control unit when a predetermined condition is satisfied, wherein the second software radio function unit includes a second transceiver that performs radio communication with the radio terminal, a second autonomous control unit that controls radio communication between the second transceiver and the radio terminal in a state where transfer of a signal between the second software radio function unit and the first software radio function unit is stopped, and a second monitor unit that activates the second autonomous control unit when a predetermined condition is satisfied, and wherein the first autonomous control unit causes the first transceiver to exchange a vital monitoring signal with the radio control device, and wherein the second autonomous control unit causes the second transceiver to transmit a signal for causing the radio terminal to perform a predetermined operation.

2. A wireless relay method performed by a wireless relay apparatus including a first software radio function unit that performs radio communication with a radio control device and a second software radio function unit that performs radio communication with a radio terminal which is under control of the radio control device, the wireless relay method comprising:

a first transfer step of capturing, as In-phase and Quadrature "iq" data, a radio signal received by the first software radio function unit from the radio control device and transferring the captured iq data to the second software radio function unit in real time;

a second transfer step of capturing, as iq data, a radio signal received by the second software radio function unit from the radio terminal and transferring the captured iq data to the first software radio function unit in real time;

a first transmission step of converting the iq data transferred in the second transfer step into a radio signal and transmitting the radio signal to the radio control device;

a second transmission step of converting the iq data transferred in the first transfer step into a radio signal and transmitting the radio signal to the radio terminal;

a first autonomous control step of controlling radio communication between the first software radio function unit and the radio control device in a state where the first transfer step and the second transfer step are stopped when a predetermined condition is satisfied; and a second autonomous control step of controlling radio communication between the second software radio function unit and the radio terminal in a state where the first transfer step and the second transfer step are stopped when a predetermined condition is satisfied, wherein, in the first autonomous control step, the first software radio function unit is caused to exchange a vital monitoring signal with the radio control device, and wherein, the second autonomous control step, the second software radio function unit is caused to transmit a signal for causing the radio terminal to perform a predetermined operation.

\* \* \* \* \*